(12) United States Patent
Jang et al.

(10) Patent No.: US 7,985,160 B2
(45) Date of Patent: Jul. 26, 2011

(54) GEAR TRAIN OF AUTOMATIC TRANSMISSION

(75) Inventors: Wookjin Jang, Yongin (KR); Jinhyung Kong, Gwacheon (KR)

(73) Assignee: Hyundai Motor Company, Seoul (KR)

( * ) Notice: Subject to any disclaimer, the term of this patent is extended or adjusted under 35 U.S.C. 154(b) by 191 days.

(21) Appl. No.: 12/473,824

(22) Filed: May 28, 2009

(65) Prior Publication Data

US 2009/0298638 A1   Dec. 3, 2009

(30) Foreign Application Priority Data

Jun. 2, 2008   (KR) .................. 10-2008-0051752

(51) Int. Cl.
*F16H 3/44*   (2006.01)

(52) U.S. Cl. ........................ 475/285; 475/275
(58) Field of Classification Search .............. 475/269, 475/275, 276, 284–287
See application file for complete search history.

(56) References Cited

U.S. PATENT DOCUMENTS 6,997,844 B2 *   2/2006   Bucknor et al. ............. 475/275

FOREIGN PATENT DOCUMENTS

JP   2005-106260 A   4/2005

* cited by examiner

*Primary Examiner* — Justin Holmes
(74) *Attorney, Agent, or Firm* — Morgan, Lewis & Bockius LLP

(57) ABSTRACT

A gear train of an automatic transmission for a vehicle may be provided to realize eight forward speeds and one reverse speed with three single pinion planetary gear set, four clutches and two brakes.

11 Claims, 13 Drawing Sheets

FIG. 2

| | C1 | C2 | C3 | C4 | B1 | B2 | OWC | SPEED RATIO | GEAR STEP | STEP RATIO |
|---|---|---|---|---|---|---|---|---|---|---|
| 1st | | | | ● | ● | | | 4.910 | 1 | |
| 1st | | | | ● | ○ | | ● | 4.910 | 1 | |
| 2nd | | | | ● | | ● | | 2.804 | 2 | 1.751 |
| 3rd | | | ● | ● | | | | 2.064 | 3 | 1.359 |
| 4th | | ● | | ● | | | | 1.611 | 4 | 1.281 |
| 5th | | ● | ● | | | | | 1.000 | 5 | 1.611 |
| 5th | ● | | | ● | | | | 1.000 | 5 | |
| 6th | ● | | ● | | | | | 0.728 | 6 | 1.374 |
| 7th | ● | ● | | | | | | 0.664 | 7 | 1.096 |
| 8th | ● | | | | | ● | | 0.539 | 8 | 1.233 |
| Rev | | ● | | | ● | | | -2.846 | R1 | |

GEAR TRAIN OF AUTOMATIC TRANSMISSION

CROSS-REFERENCE TO RELATED APPLICATION

This present application claims priority to Korean Patent Application Number 10-2008-0051752 filed on Jun. 2, 2008, the entire contents of which are incorporated herein for all purposes by this reference.

BACKGROUND OF THE INVENTION

1. Field of the Invention

The present invention relates to a gear train of an automatic transmission for a vehicle which may realize eight forward speeds and one reverse speed with three single pinion planetary gear set, four clutches and two brakes.

2. Description of Related Art

A typical shift mechanism of an automatic transmission utilizes a combination of a plurality of planetary gear sets. A gear train of such an automatic transmission changes rotating speed and torque received from a torque converter of the automatic transmission and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend a lot on the layout of combined planetary gear sets. Therefore, designs for a combining structure of a gear train are also under constant investigation.

A manual transmission that has too many speeds causes inconvenience of excessively frequent shifting operations to a driver. Therefore, the positive features of more shift-speeds are more important for automatic transmissions because an automatic transmission automatically controls shifting operations basically without needing manual operation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for a vehicle which may realize eight forward speeds and one reverse speed with three single pinion planetary gear set, four clutches and two brakes.

A gear train of an automatic transmission for a vehicle according to a first exemplary embodiment of the present invention may include: a first planetary gear set provided with three operating members, wherein a first operating member is selectively connected to an input shaft and selectively connected to a transmission case, a second operating member is selectively connected to the transmission case and a third operating member is fixedly connected to an output shaft; a second planetary gear set provided with three operating members, wherein a fourth operating member is fixedly connected to the input shaft, a fifth operating member, and a sixth operating member is fixedly connected with the second operating member; a third planetary gear set provided with three operating members, wherein a seventh operating member is fixedly connected to the transmission case, an eighth operating member is selectively connected to the input shaft and selectively connected with the third operating member, and a ninth operating member is fixedly connected with the fifth operating member; and a plurality of friction members comprising clutches and brakes that selectively connect the operating member with one of the other operating members, the transmission housing, or the input shaft, wherein two operating members of the first, second, and third operating members are selectively connected.

The first operating member and the second operating member may be selectively connected.

The plurality of friction members may include a first clutch selectively connects the eighth operating member to the input shaft, a second clutch selectively connects the first operating member to the input shaft, a third clutch selectively connects the first operating member with the second operating member, a fourth clutch selectively connects the third operating member with the eighth operating member, a first brake selectively connects the second operating member to the transmission case and a second brake selectively connects the first operating member to the transmission case.

The first planetary gear set may be a single pinion planetary gear set comprising a first sun gear, a first planet carrier and a first ring gear, and the first sun gear is operated as the first operating member, the first planet carrier is operated as the second operating member and the first ring gear is operated as the third operating member, the second planetary gear set may be a single pinion planetary gear set comprising a second sun gear, a second planet carrier and a second ring gear, and the second sun gear is operated as the fourth operating member, the second planet carrier is operated as the fifth operating member and the second ring gear is operated as the sixth operating member, and the third planetary gear set may be a single pinion planetary gear set comprising a third sun gear, a third planet carrier and a third ring gear, and the third sun gear is operated as the seventh operating member, the third planet carrier is operated as the eighth operating member and the third ring gear is operated as the ninth operating member.

The fourth clutch and the first brake may be operated in a first forward speed, the fourth clutch and the second brake may be operated in a second forward speed, the third clutch and the fourth clutch may be operated in a third forward speed, the second clutch and the fourth clutch may be operated in a fourth forward speed, the first clutch and the third clutch may be operated in a sixth forward speed, the first clutch and the second clutch may be operated in a seventh forward speed, the first clutch and the second brake may be operated in an eighth forward speed, the second clutch and the first brake may be operated in one reverse speed and one of a group including the second clutch and the third clutch and a group including the first clutch and the fourth clutch is operated in a fifth forward speed.

A one-way clutch may be disposed in parallel with the first brake, the fourth clutch and the one-way clutch may be operated in a first forward speed, the fourth clutch and the second brake may be operated in a second forward speed, the third clutch and the fourth clutch may be operated in a third forward speed, the second clutch and the fourth clutch may be operated in a fourth forward speed, the first clutch and the third clutch may be operated in a sixth forward speed, the first clutch and the second clutch may be operated in a seventh forward speed, the first clutch and the second brake may be operated in an eighth forward speed, the second clutch and the first brake may be operated in one reverse speed and one of a group including the second clutch and the third clutch and a group including the first clutch and the fourth clutch is operated in a fifth forward speed.

The second operating member and the third operating member according to a second exemplary embodiment of the present invention may be selectively connected.

The plurality of friction members may includes a first clutch selectively connects the eighth operating member to the input shaft, a second clutch selectively connects the first operating member to the input shaft, a the third clutch selectively connects the second operating member with the third operating member, a fourth clutch selectively connects the third operating member with the eighth operating member, a first brake selectively connects the second operating member to the transmission case and a second brake selectively connects the first operating member to the transmission case.

The gear train of an automatic transmission for a vehicle according to exemplary embodiments of the present invention may enhance power delivery performance with increased shift-speed and fuel consumption may be reduced.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart for the gear train of FIG. 1.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
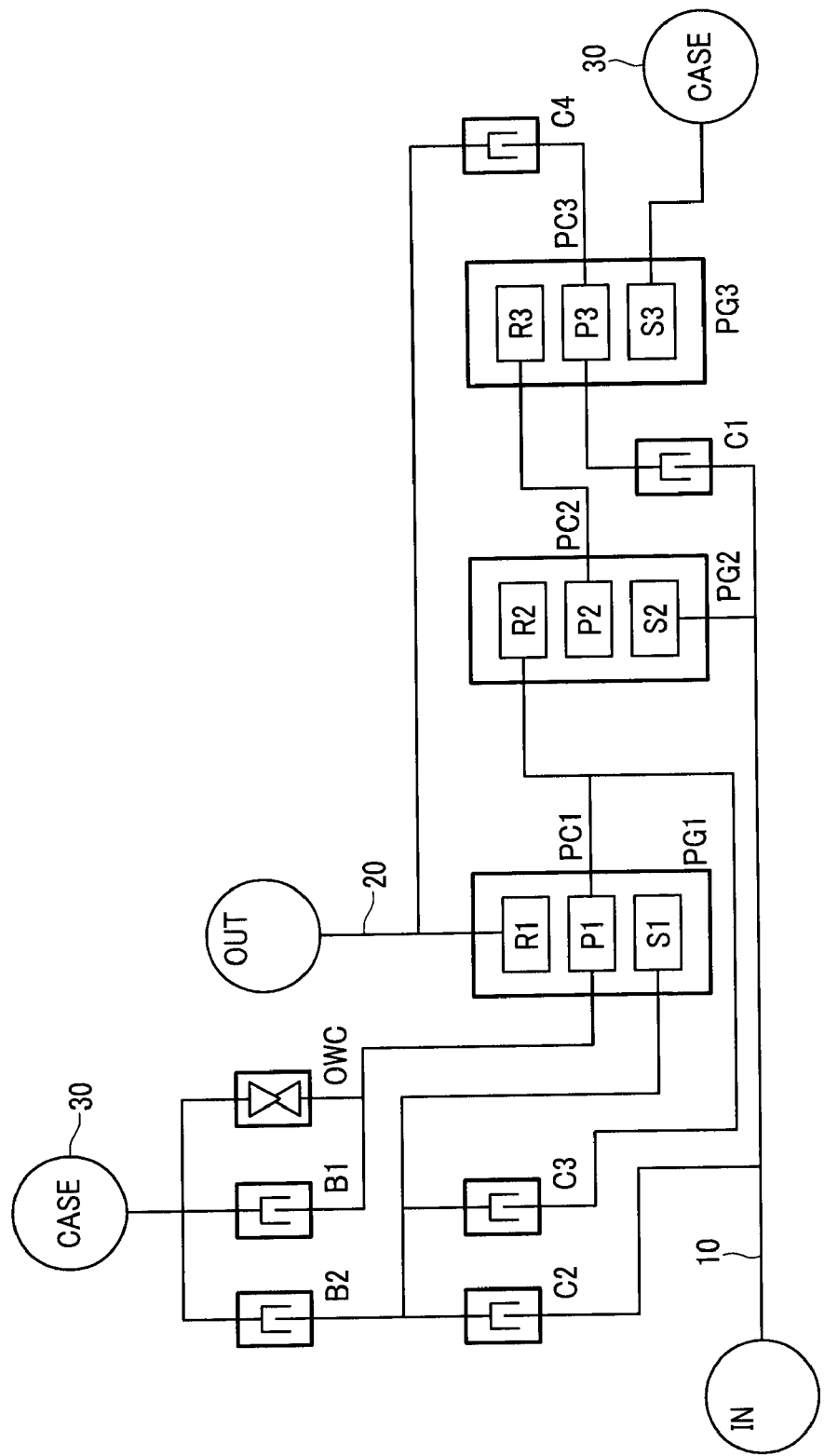
FIG. 1 is a schematic diagram of an exemplary gear train according to the present invention.

As shown in FIG. 1, an exemplary gear train of an automatic transmission according to the present invention includes an input shaft 10, an output shaft 20, a transmission case 30 and a first, second, and third planetary gear set PG1, PG2, and PG3.

The input shaft 10 receives power generated by an engine (not shown) through a torque converter (not shown).

The output shaft 20 outputs power from the gear train.

The first planetary gear set PG1 is a single pinion planetary gear set and includes a first sun gear S1, a first planet carrier PC1 and a first ring gear R1 as operating members. A first pinion gear P1 is connected to the first planet carrier PC1 and engaged with the first sun gear S1 and the first ring gear R1.

The second planetary gear set PG2 is a single pinion planetary gear set and includes a second sun gear S2, a second planet carrier PC2 and a second ring gear R2 as operating members. A second pinion gear P2 is connected to the second planet carrier PC2 and engaged with the second sun gear S2 and the second ring gear R2.

The third planetary gear set PG3 is a single pinion planetary gear set and includes a third sun gear S3, a third planet carrier PC3 and a third ring gear R3 as operating members. A third pinion gear P3 is connected to the third planet carrier PC3 and engaged with the third sun gear S3 and the third ring gear R3.

The first sun gear S1 is selectively connected to the input shaft 10, selectively connected with the first planet carrier PC1 and selectively connected to the transmission case 30.

The first planet carrier PC1 is selectively connected to the transmission case 30 and is fixedly connected with the second ring gear R2.

The first ring gear R1 is fixedly connected to the output shaft 20.

The second sun gear S2 is fixedly connected to the input shaft 10.

The second planet carrier PC2 is fixedly connected with the third ring gear R3.

The third sun gear S3 is fixed to the transmission case 30.

The third planet carrier PC3 is selectively connected to the input shaft 10 and selectively connected with the first ring gear R1.

The gear train further includes a plurality of friction members (C1, C2, C3, C4, B1, B2) that selectively connect the operating member of the planetary gear sets PG1, PG2, and PG3 with the input shaft 10, the output shaft 20, the transmission case 30 and one of the other operating members.

The first clutch C1 selectively connects the third planet carrier PG3 to the input shaft 10 and the second clutch C2 selectively connects the first sun gear S1 to the input shaft 10.

The third clutch C3 selectively connects the first sun gear S1 with the first planet carrier PC1 and the fourth clutch C4 selectively connects the third planet carrier PC3 with the first ring gear R1.

The first brake B1 selectively connects the first planet carrier PC1 to the transmission case 30.

The first brake B2 selectively connects the first sun gear S1 to the transmission case 30.

A one-way clutch OWC may be disposed in parallel with the first brake B1 and the one-way clutch OWC selectively connects the first planet carrier PC1 to the transmission case 30.

As shown in FIG. 2, the automatic transmission may realize eighth forward speeds and one reverse speed by operations of two friction members in each shift-speed.

That is, in the first forward speed, the fourth clutch C4 and the first brake B1 are operated or the fourth clutch C4 and the one-way clutch OWC are operated.

The fourth clutch C4 and the second brake B2 are operated in the second forward speed.

The third clutch C3 and the fourth clutch C4 are operated in the third forward speed and the second clutch C2 and the fourth clutch C4 are operated in the fourth forward speed.

In the fifth forward speed, the second clutch C2 and the third clutch C3 are operated or the first clutch C1 and the fourth clutch C4 are operated.

The first clutch C1 and the third clutch C3 are operated in the sixth forward speed and the first clutch C1 and the second clutch C2 are operated in the seventh forward speed.

The first clutch C1 and the second brake B2 are operated in the eighth forward speed and the second clutch C2 and the first brake B1 are operated in one reverse speed.

Hereinafter, referring to FIG. 3 to FIG. 11, shifting processes in the gear train according to various embodiments of the present invention will be described.

The first sun gear S1 is a first operating member N1, the first planet carrier PC1 is a second operating member N2 and the first ring gear R1 is a third operating member N3. The second sun gear S2 is a fourth operating member N4, the second planet carrier PC2 is a the fifth operating member N5 and the second ring gear R2 is a sixth operating member N6. And third sun gear S3 is a seventh operating member N7, the third planet carrier PC3 is a the eighth operating member N8 and the third ring gear R3 is a ninth operating member N9.

First Forward Speed

In the first forward speed, the fourth clutch C4 and the first brake B1 are operated or the fourth clutch C4 and the one-way clutch OWC are operated.

Rotation speed of the input shaft 10 is transmitted to the fourth operating member N4 and the second operating member N2 and the sixth operating member N6 are stopped by an operation of the first brake B1 or the one-way clutch OWC.

Figure 3:
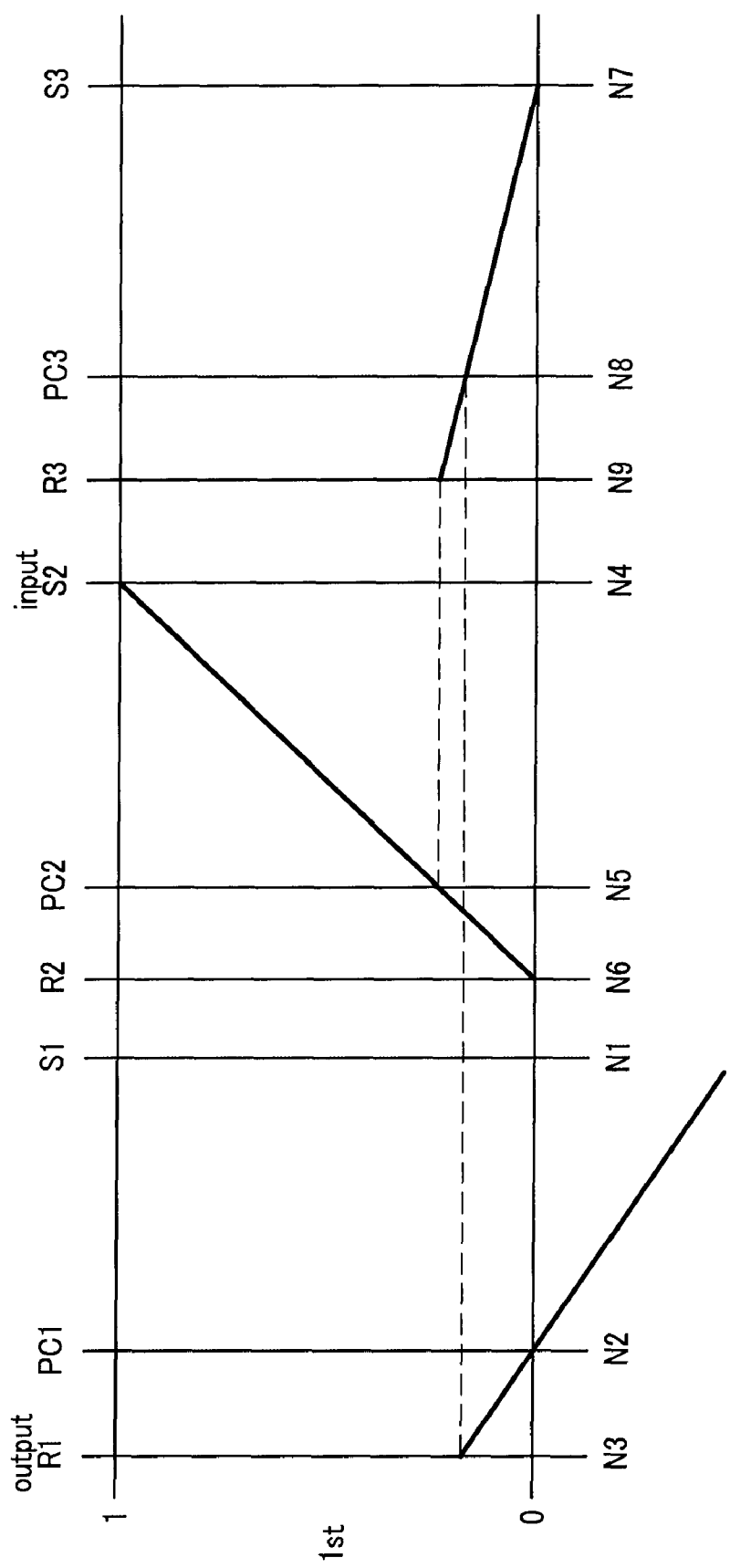
FIG. 3 to FIG. 11 are lever diagrams of the gear train of FIG. 1.

The fifth operating member N5 rotates with the same rotational speed as the ninth operating member N9, and the eighth operating member N8 rotates with the same rotational speed as the third operating member N3 by an operation of the fourth clutch C4. Thus, the third operating member N3 outputs the first forward speed as shown in FIG. 3 by combination of the first, second, and third planetary gear sets PG1, PG2, and PG3.

Second Forward Speed

The fourth clutch C4 and the second brake B2 are operated in the second forward speed.

Rotation speed of the input shaft 10 is transmitted to the fourth operating member N4, the second operating member N2 rotates with the same rotational speed as the sixth operating member N6, and the fifth operating member N5 rotates with the same rotational speed as the ninth operating member N9.

The eighth operating member N8 rotates with the same rotational speed as the third operating member N3 by an operation of the fourth clutch C4.

Figure 4:
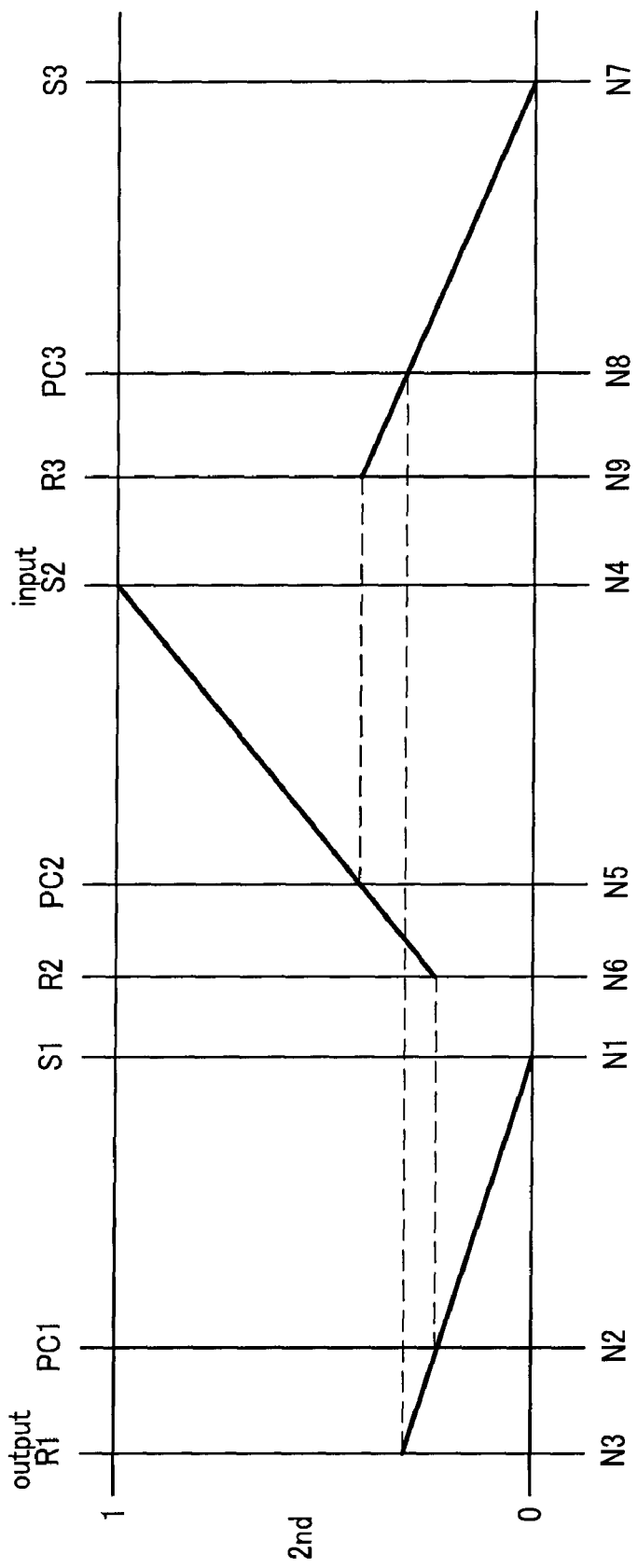

Thus, the third operating member N3 outputs the second forward speed as shown in FIG. 4 by combination of the first, second, and third planetary gear sets PG1, PG2, and PG3.

Third Forward Speed

The third clutch C3 and the fourth clutch C4 are operated in the third forward speed.

The fourth operating member N4 rotates with the same rotational speed as the input shaft 10 and the fifth operating member N5 rotates with the same rotational speed as the ninth operating member N9.

The first planetary gear set PG1 rotates as a whole by an operation of the third clutch C3 and the eighth operating member N8 rotates with the same rotational speed as the first planetary gear set PG1 by an operation of the fourth clutch C4.

Figure 5:
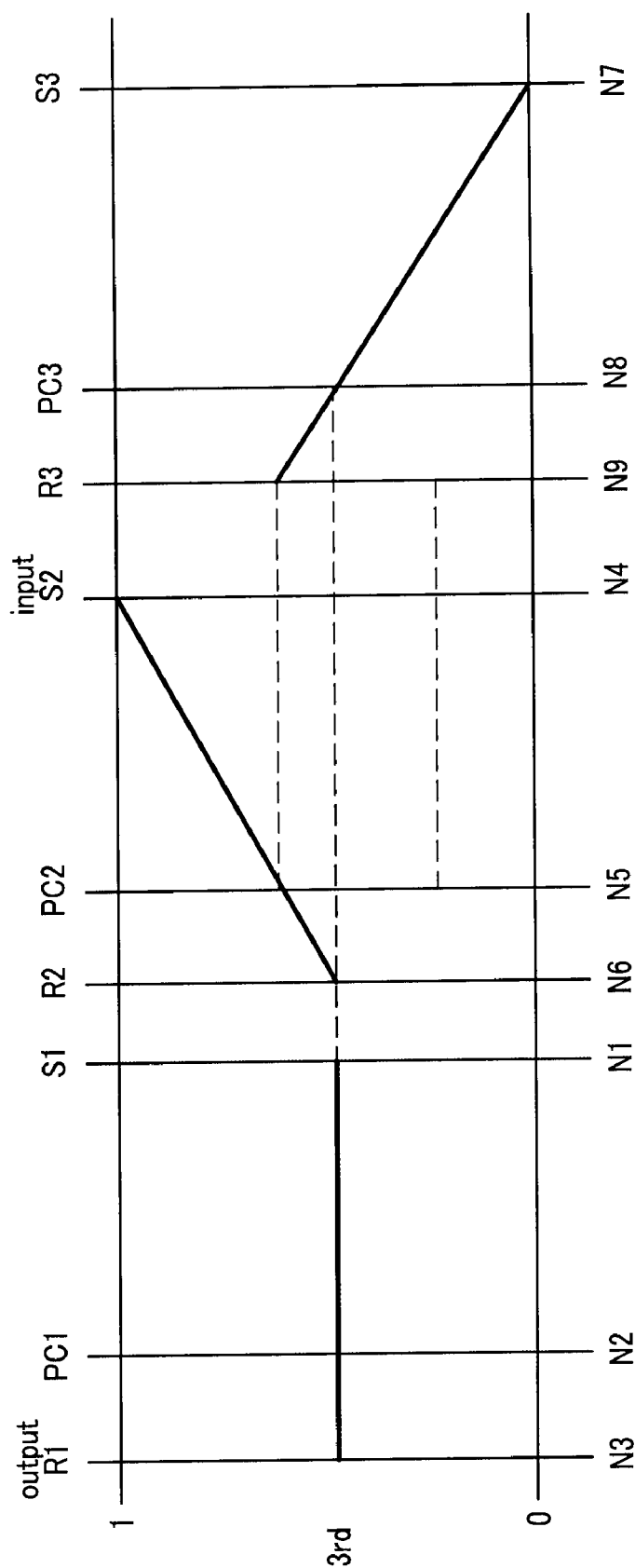

Thus, the third operating member N3 outputs the third forward speed as shown in FIG. 5 by combination of the first, second, and third planetary gear sets PG1, PG2, and PG3.

Fourth Forward Speed

The second clutch C2 and the fourth clutch C4 are operated in the fourth forward speed.

The rotational speed of the input shaft 10 is simultaneously transmitted to the first operating member N1 and the fourth operating member N4 by an operation of the second clutch C2.

The second operating member N2 rotates with the same rotational speed as the sixth operating member N6 and the fifth operating member N5 rotates with the same rotational speed as the ninth operating member N9.

The third operating member N3 rotates with the same rotational speed as the eighth operating member N8 by an operation of the fourth clutch C4.

Figure 6:
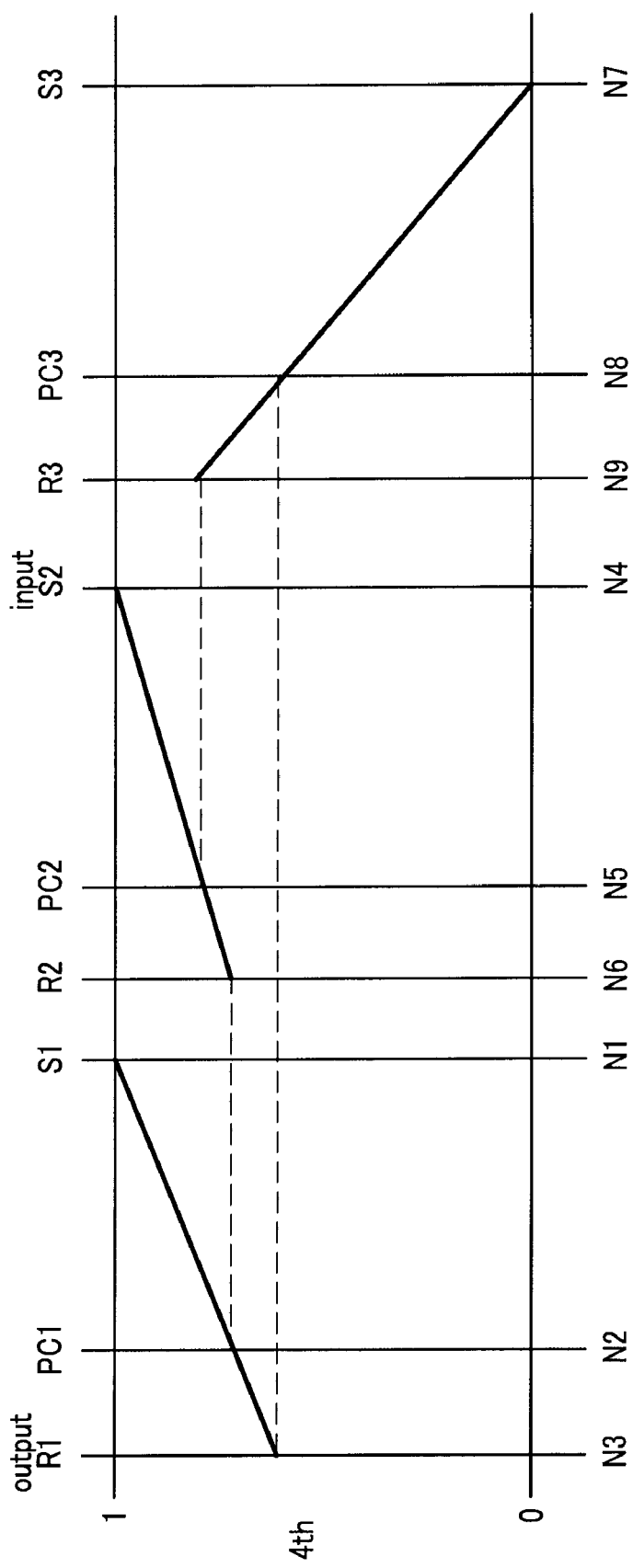

Thus, the third operating member N3 outputs the fourth forward as shown in FIG. 6 speed by combination of the first, second, and third planetary gear sets PG1, PG2, and PG3.

Fifth Forward Speed

In the fifth forward speed, the second clutch C2 and the third clutch C3 are operated or the first clutch C1 and the fourth clutch C4 are operated.

When the second clutch C2 and the third clutch C3 are operated, the rotational speed of the input shaft 10 is simultaneously transmitted to the first operating member N1 and the fourth operating member N4 and the first planetary gear set PG1 and the second planetary gear set PG2 integrally rotate as a whole.

Figure 7:
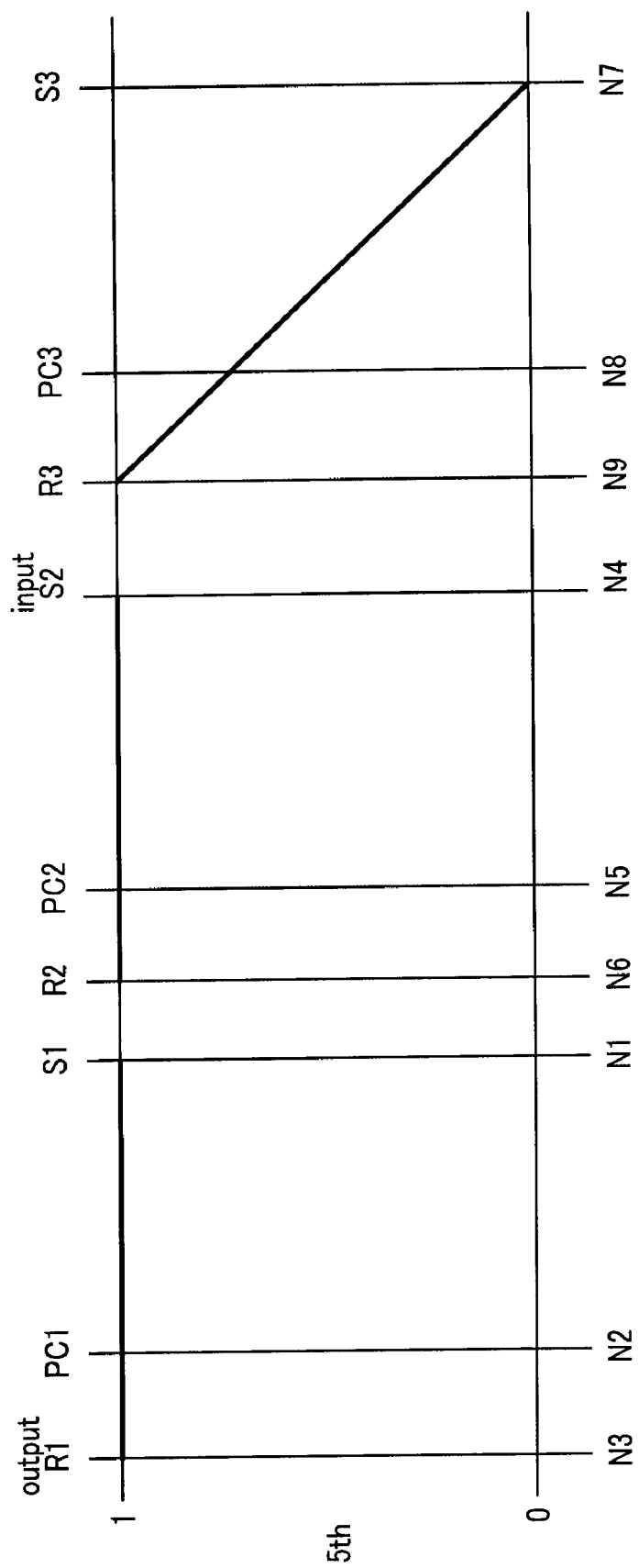

Thus, the third operating member N3 outputs the fifth forward speed (the rotational speed of the input shaft 10) as shown in FIG. 7 by combination of the first, second, and third planetary gear sets PG1, PG2, and PG3.

When the first clutch C1 and the fourth clutch C4 are operated, the input shaft 10, the eighth operating member N8 and the output shaft 30 are directly connected.

Thus, the third operating member N3 outputs the fifth forward speed (the rotational speed of the input shaft 10).

Sixth Forward Speed

The first clutch C1 and the third clutch C3 are operated in the sixth forward speed.

The first planetary gear set PG1 integrally rotates as a whole by an operation of the third clutch C3, the rotational speed of the input shaft 10 is transmitted to the fourth operating member N4 and the fifth operating member N5 rotates with the same rotational speed as the ninth operating member N9.

Figure 8:
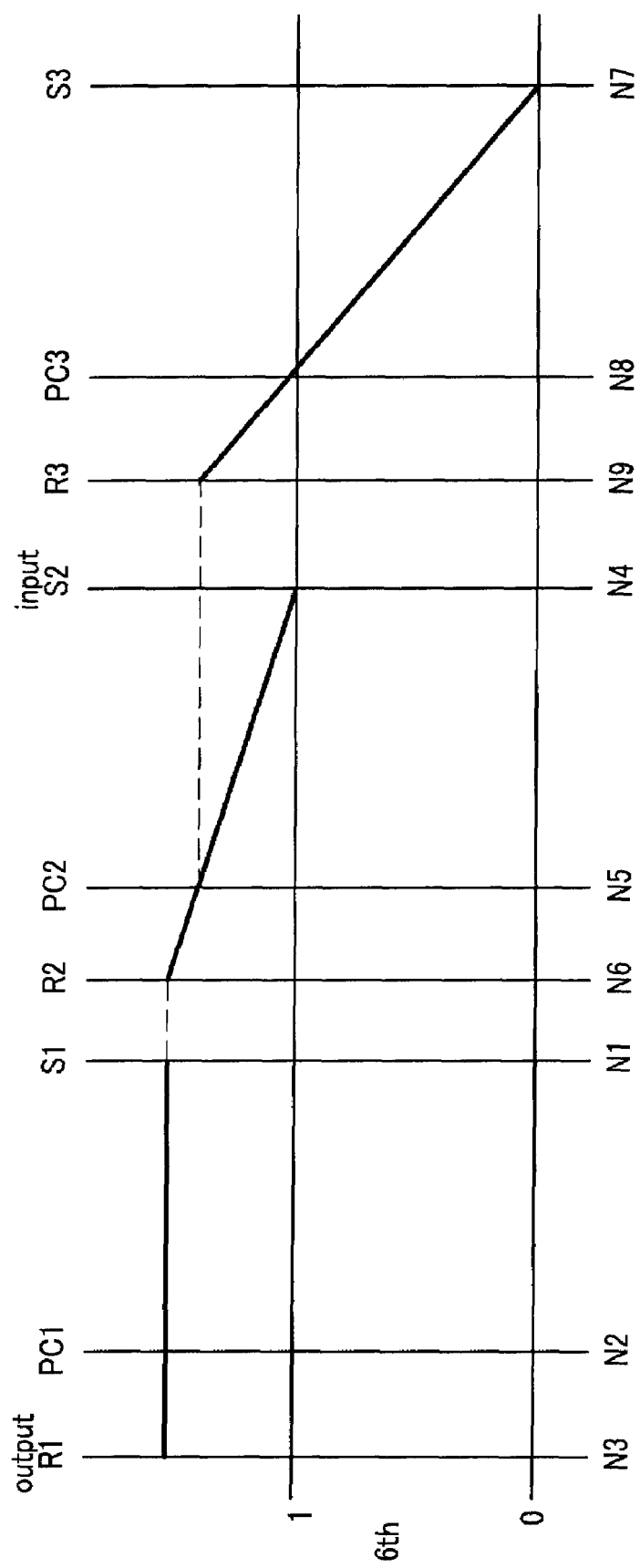

Thus, the third operating member N3 outputs the sixth forward speed as shown in FIG. 8 by combination of the first, second, and third planetary gear sets PG1, PG2, and PG3.

Seventh Forward Speed

The first clutch C1 and the second clutch C2 are operated in the seventh forward speed.

The rotational speed of the input shaft 10 is simultaneously transmitted to the first operating member N1, the fourth operating member N4 and the eighth operating member N8, the second operating member N2 rotates with the same rotational speed as the sixth operating member N6, and the fifth operating member N5 rotates with the same rotational speed as the ninth operating member N9.

Figure 9:
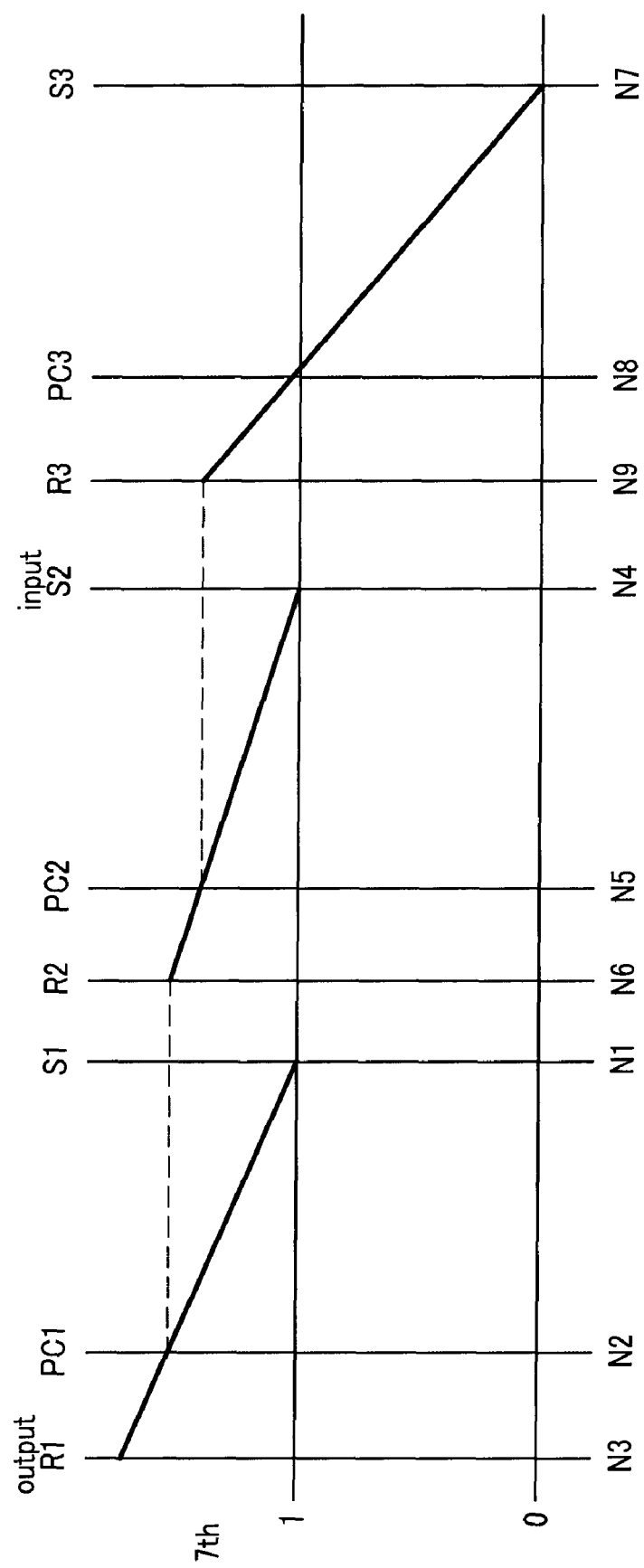

Thus, the third operating member N3 outputs the seventh forward speed as shown in FIG. 9 by combination of the first, second, and third planetary gear sets PG1, PG2, and PG3.

Eighth Forward Speed

The first clutch C1 and the second brake B2 are operated in the eighth forward speed.

The rotational speed of the input shaft 10 is simultaneously transmitted to the fourth operating member N4 and the eighth operating member N8 and the first operating member N1 is stopped by an operation of the second brake B2.

The second operating member N2 rotates with the same rotational speed as the sixth operating member N6 and the fifth operating member N5 rotates with the same rotational speed as the ninth operating member N9.

Figure 10:
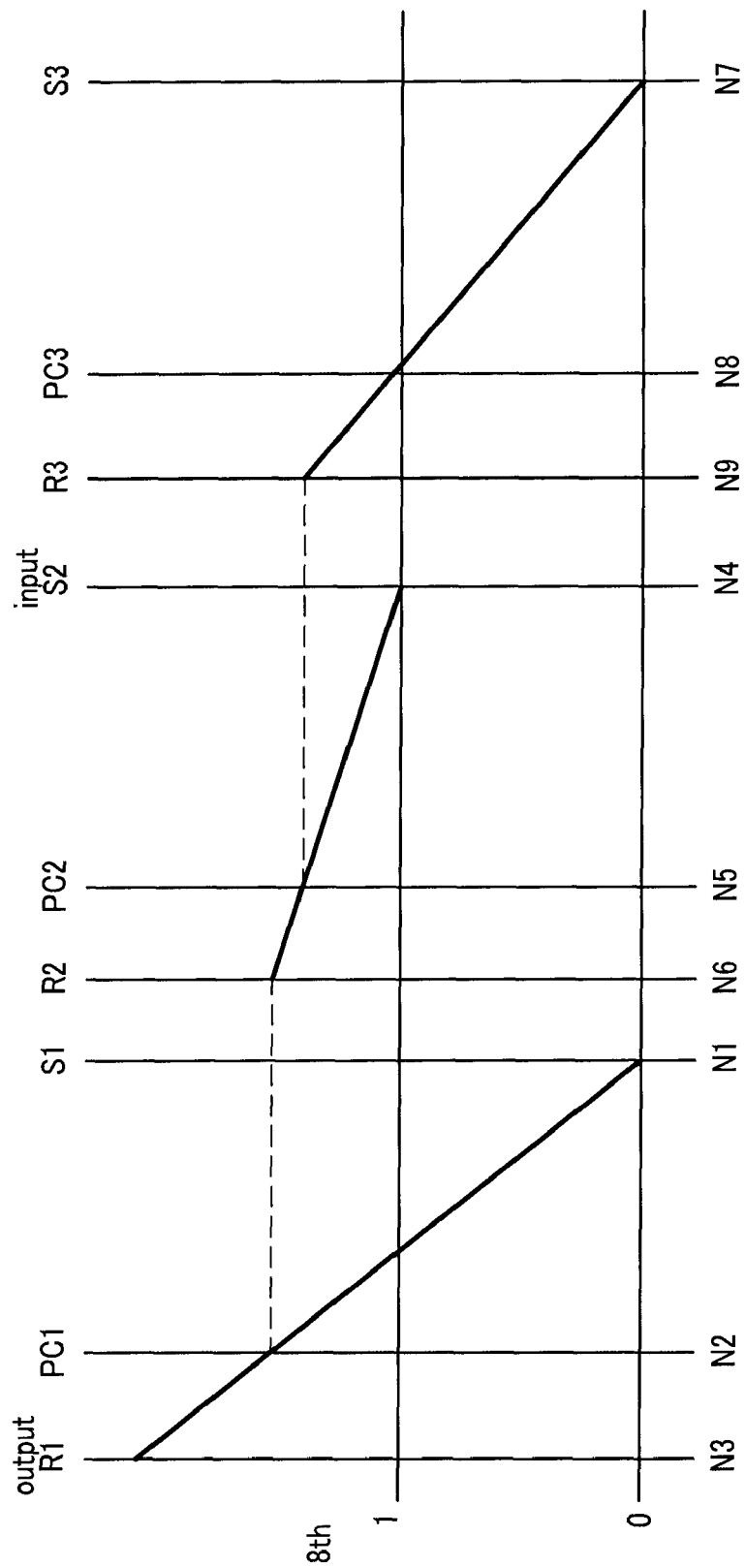
Figure 11:
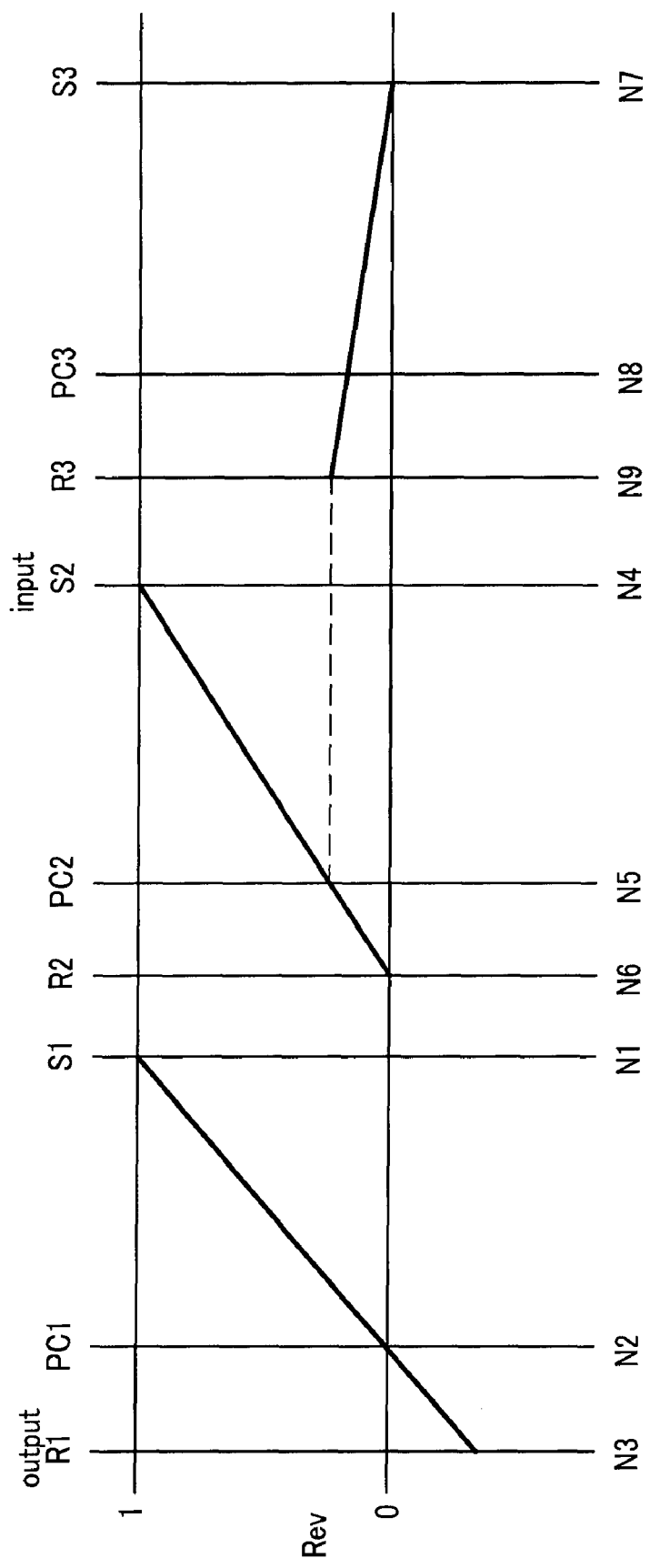

Thus, the third operating member N3 outputs the eighth forward speed as shown in FIG. 10 by combination of the first, second, and third planetary gear sets PG1, PG2, and PG3.

One Reverse Speed

The second clutch C2 and the first brake B1 are operated in one reverse speed.

The rotational speed of the input shaft 10 is transmitted to the first operating member N1 and the second operating member N2 is stopped by an operation of the first brake B1.

Thus, the third operating member N3 outputs one reverse speed.

Figure 12:
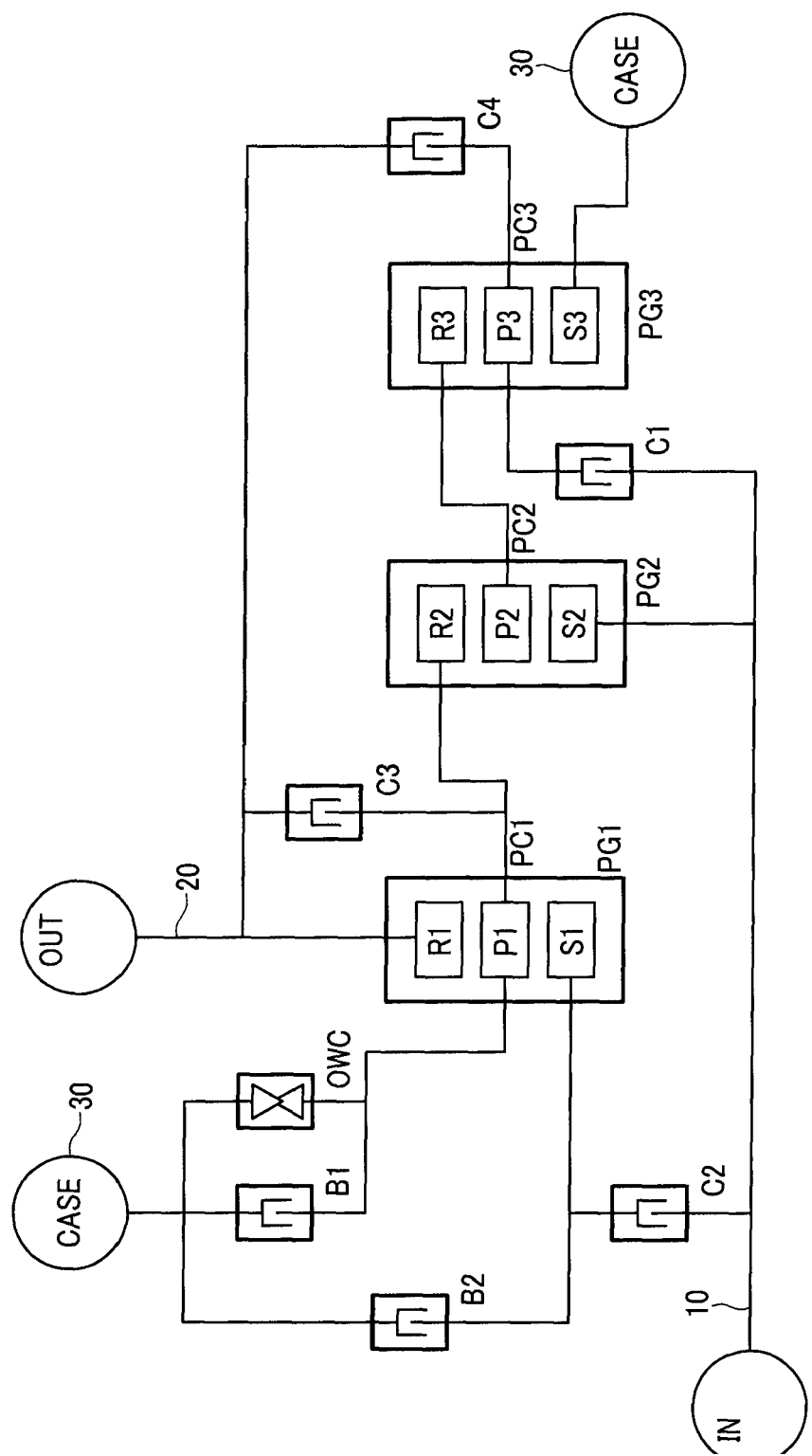
FIG. 12 is a schematic diagram of another exemplary gear train according to the present invention.

FIG. 12 is a schematic diagram of another exemplary gear train according to the present invention. This gear train of the automatic transmission is similar to that described above and hereinafter, the different between them will be explained.

An arrangement of the third clutch C3 in various embodiments of the present invention is different from that described above and the third clutch C3 selectively connects the third operating member N3 with the second operating member N2 and the sixth operating member N6.

Figure 13:
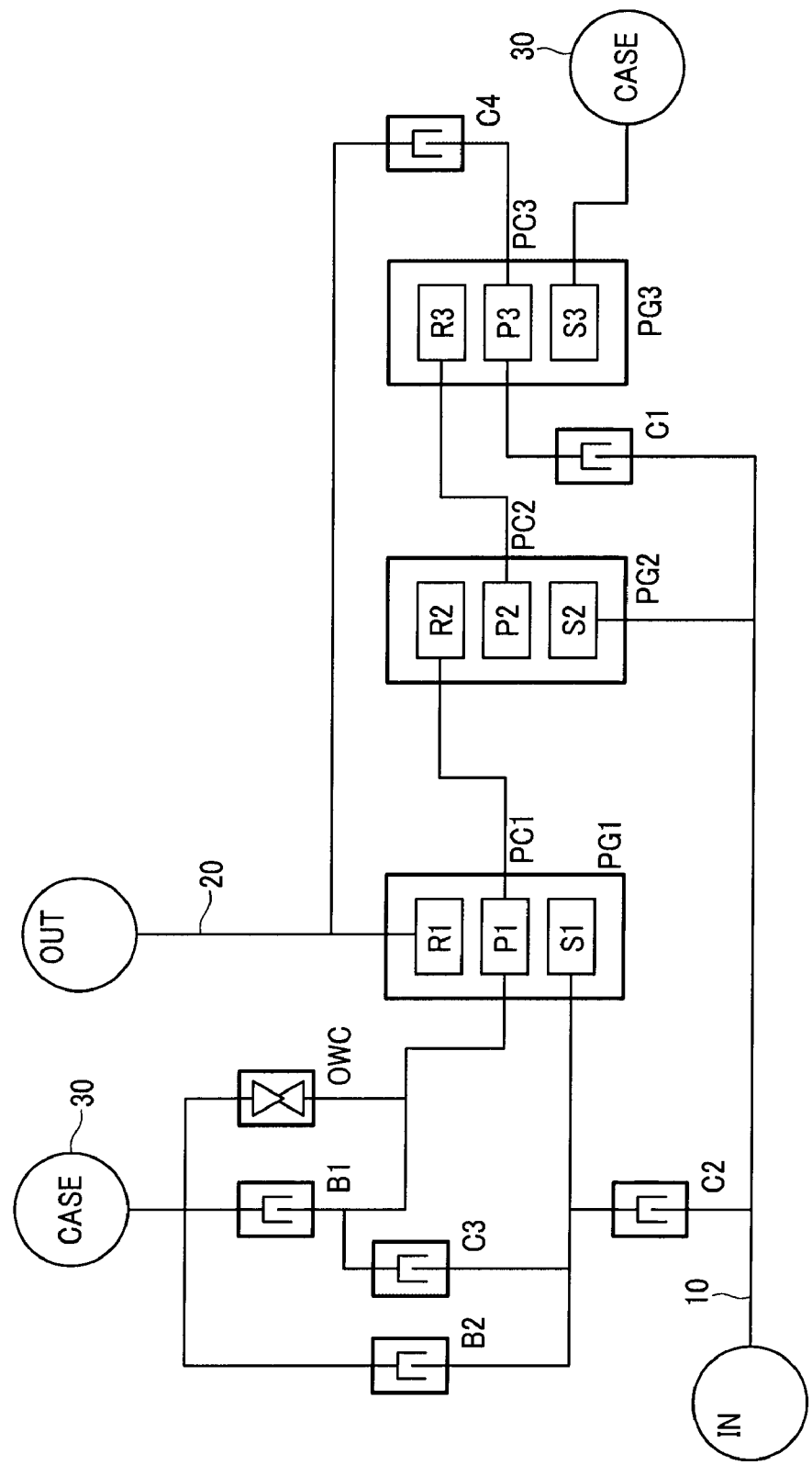
FIG. 13 is a schematic diagram of another exemplary gear train according to the present invention.

FIG. 13 is a schematic diagram of a gear train according to another exemplary embodiment of the present invention.

This gear train of the automatic transmission of is similar to that described above and hereinafter, the differences will be explained.

An arrangement of the third clutch C3 in various embodiments of the present invention is different from that described above and the third clutch C3 selectively connects the first operating member N1 with the second operating member N2. In an above-described gear train of the automatic transmission, the third clutch C3 selectively connects the first operating member N1 with the second operating member N2 and the sixth operating member N6.

Operating elements and lever diagrams of the additional exemplary embodiments of the present invention are identical with that of the first exemplary embodiment of the present invention except for the third clutch C3 so that detailed explanation will be omitted.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for a vehicle comprising:
    a first planetary gear set provided with three operating members, wherein a first operating member is selectively connected to an input shaft and selectively connected to a transmission case, a second operating member is selectively connected to the transmission case and a third operating member is fixedly connected to an output shaft;
    a second planetary gear set provided with three operating members, wherein a fourth operating member is fixedly connected to the input shaft, a fifth operating member, and a sixth operating member is fixedly connected with the second operating member;
    a third planetary gear set provided with three operating members, wherein a seventh operating member is fixedly connected to the transmission case, an eighth operating member is selectively connected to the input shaft and selectively connected with the third operating member, and a ninth operating member is fixedly connected with the fifth operating member; and
    a plurality of friction members comprising clutches and brakes that each selectively connect one of the operating members with another one of the other operating members, the transmission housing, or the input shaft,
    wherein two operating members of the first, second, and third operating members are selectively connected with one of said friction members.

2. The gear train of an automatic transmission for a vehicle of claim 1, wherein the first operating member and the second operating member are selectively connected.

3. The gear train of an automatic transmission for a vehicle of claim of claim 2, the plurality of friction members comprises:
    a first clutch selectively connects the eighth operating member to the input shaft;
    a second clutch selectively connects the first operating member to the input shaft;
    a third clutch selectively connects the first operating member with the second operating member;
    a fourth clutch selectively connects the third operating member with the eighth operating member;
    a first brake selectively connects the second operating member to the transmission case; and
    a second brake selectively connects the first operating member to the transmission case.

4. The gear train of an automatic transmission for a vehicle of claim 3, wherein:
    the first planetary gear set is a single pinion planetary gear set comprising a first sun gear, a first planet carrier and a first ring gear,
    and the first sun gear is operated as the first operating member, the first planet carrier is operated as the second operating member and the first ring gear is operated as the third operating member;
    the second planetary gear set is a single pinion planetary gear set comprising a second sun gear, a second planet carrier and a second ring gear,
    and the second sun gear is operated as the fourth operating member, the second planet carrier is operated as the fifth operating member and the second ring gear is operated as the sixth operating member; and
    the third planetary gear set is a single pinion planetary gear set comprising a third sun gear, a third planet carrier and a third ring gear,
    and the third sun gear is operated as the seventh operating member, the third planet carrier is operated as the eighth operating member and the third ring gear is operated as the ninth operating member.

5. The gear train of an automatic transmission for a vehicle of claim 4, wherein:
    the fourth clutch and the first brake are operated in a first forward speed;
    the fourth clutch and the second brake are operated in a second forward speed;
    the third clutch and the fourth clutch are operated in a third forward speed;
    the second clutch and the fourth clutch are operated in a fourth forward speed;

the first clutch and the third clutch are operated in a sixth forward speed;
the first clutch and the second clutch are operated in a seventh forward speed;
the first clutch and the second brake are operated in an eighth forward speed;
the second clutch and the first brake are operated in one reverse speed; and
one of a group including the second clutch and the third clutch and a group including the first clutch and the fourth clutch is operated in the fifth forward speed.

6. The gear train of an automatic transmission for a vehicle of claim 4, wherein:
a one-way clutch is disposed in parallel with the first brake;
the fourth clutch and the one-way clutch are operated in a first forward speed;
the fourth clutch and the second brake are operated in a second forward speed;
the third clutch and the fourth clutch are operated in a third forward speed;
the second clutch and the fourth clutch are operated in a fourth forward speed;
the first clutch and the third clutch are operated in a sixth forward speed;
the first clutch and the second clutch are operated in a seventh forward speed;
the first clutch and the second brake are operated in an eighth forward speed;
the second clutch and the first brake are operated in one reverse speed; and
one of a group including the second clutch and the third clutch and a group including the first clutch and the fourth clutch is operated in a fifth forward speed.

7. The gear train of an automatic transmission for a vehicle of claim 1, wherein the second operating member and the third operating member are selectively connected.

8. The gear train of an automatic transmission for a vehicle of claim 7, the plurality of friction members comprises:
a first clutch selectively connects the eighth operating member to the input shaft;
a second clutch selectively connects the first operating member to the input shaft;
a third clutch selectively connects the second operating member with the third operating member;
a fourth clutch selectively connects the third operating member with the eighth operating member;
a first brake selectively connects the second operating member to the transmission case; and
a second brake selectively connects the first operating member to the transmission case.

9. The gear train of an automatic transmission for a vehicle of claim 8, wherein:
the first planetary gear set is a single pinion planetary gear set comprising a first sun gear, a first planet carrier and a first ring gear,
and the first sun gear is operated as the first operating member, the first planet carrier is operated as the second operating member and the first ring gear is operated as the third operating member;
the second planetary gear set is a single pinion planetary gear set comprising a second sun gear, a second planet carrier and a second ring gear,
and the second sun gear is operated as the fourth operating member, the second planet carrier is operated as the fifth operating member and the second ring gear is operated as the sixth operating member; and
the third planetary gear set is a single pinion planetary gear set comprising a third sun gear, a third planet carrier and a third ring gear,
and the third sun gear is operated as the seventh operating member, the third planet carrier is operated as the eighth operating member and the third ring gear is operated as the ninth operating member.

10. The gear train of an automatic transmission for a vehicle of claim 9, wherein:
the fourth clutch and the first brake are operated in a first forward speed;
the fourth clutch and the second brake are operated in a second forward speed;
the third clutch and the fourth clutch are operated in a third forward speed;
the second clutch and the fourth clutch are operated in a fourth forward speed;
the first clutch and the third clutch are operated in a sixth forward speed;
the first clutch and the second clutch are operated in a seventh forward speed;
the first clutch and the second brake are operated in an eighth forward speed;
the second clutch and the first brake are operated in one reverse speed; and
one of a group including the second clutch and the third clutch and a group including the first clutch and the fourth clutch is operated in a fifth forward speed.

11. The gear train of an automatic transmission for a vehicle of claim 9, wherein:
a one-way clutch is disposed in parallel with the first brake;
the fourth clutch and the one-way clutch are operated in a first forward speed;
the fourth clutch and the second brake are operated in a second forward speed;
the third clutch and the fourth clutch are operated in a third forward speed;
the second clutch and the fourth clutch are operated in a fourth forward speed;
the first clutch and the third clutch are operated in a sixth forward speed;
the first clutch and the second clutch are operated in a seventh forward speed;
the first clutch and the second brake are operated in an eighth forward speed;
the second clutch and the first brake are operated in one reverse speed; and
one of a group including the second clutch and the third clutch and a group including the first clutch and the fourth clutch is operated in a fifth forward speed.

* * * * *